US009215750B2

(12) United States Patent
Hieber et al.

(10) Patent No.: US 9,215,750 B2
(45) Date of Patent: Dec. 15, 2015

(54) SYSTEM AND METHOD FOR HEATING BACK-UP BATTERY OF MOTOR VEHICLE EMERGENCY RADIO COMMUNICATION DEVICE WHEN TEMPERATURE IS BELOW A LIMIT VALUE

(71) Applicant: VARTA Microbattery GmbH, Ellwangen (DE)

(72) Inventors: Robert Hieber, Unterschneidheim (DE); Rainer Hald, Ellwangen (DE)

(73) Assignee: VARTA Microbattery GmbH (DE)

( * ) Notice: Subject to any disclaimer, the term of this patent is extended or adjusted under 35 U.S.C. 154(b) by 246 days.

(21) Appl. No.: 13/852,249

(22) Filed: Mar. 28, 2013

(65) Prior Publication Data

US 2013/0260700 A1   Oct. 3, 2013

(30) Foreign Application Priority Data

Mar. 30, 2012   (EP) ..................... 12162622

(51) Int. Cl.
*H04W 88/02* (2009.01)
*B60R 16/033* (2006.01)
*H01M 10/625* (2014.01)
*H01M 10/615* (2014.01)
*H01M 10/6571* (2014.01)
*B60R 21/00* (2006.01)
*G08G 1/00* (2006.01)

(52) U.S. Cl.
CPC ............. *H04W 88/02* (2013.01); *B60R 16/033* (2013.01); *H01M 10/615* (2015.04); *H01M 10/625* (2015.04); *H01M 10/6571* (2015.04); *B60R 2021/0027* (2013.01); *G08G 1/205* (2013.01)

(58) Field of Classification Search
None
See application file for complete search history.

(56) References Cited

U.S. PATENT DOCUMENTS

| 5,710,507 A  *  | 1/1998 | Rosenbluth et al. ............ 307/66 |
| 2008/0226969 A1 * | 9/2008 | Fattig .............................. 429/90 |
| 2012/0149323 A1 * | 6/2012 | Springs et al. ............. 455/404.1 |
| 2012/0255944 A1 * | 10/2012 | Zhang et al. .................. 219/494 |

FOREIGN PATENT DOCUMENTS

| CN | 1630129 A | 6/2005 |
| CN | 201038282 Y | 3/2008 |
| DE | 199 45 147 A1 | 3/2000 |
| EP | 1 026 769 A2 | 1/2000 |
| WO | 03/042943 A2 | 5/2003 |
| WO | 2010/145439 A1 | 12/2010 |

* cited by examiner

*Primary Examiner* — Alejandro Rivero
(74) *Attorney, Agent, or Firm* — DLA Piper LLP (US)

(57) ABSTRACT

An emergency system for a motor vehicle having an onboard power supply system which triggers in an emergency a radio emergency call regardless of the state of the on-board power supply system of the motor vehicle, including a radio communication device that triggers the emergency call, a back-up battery including one or more electrochemical cells that supply the radio communication device with electric energy, and an electric heating device supplied with power by the onboard power supply system with which the back-up battery can be heated when its temperature is below or drops below a lower limit value, wherein the electric heating device is a heating foil including heating resistors laminated between electrically insulating foils and having a thickness <2 mm, and the heating foil is arranged in a substantially planar, two-dimensional contact to the electrochemical cell(s) of the battery.

8 Claims, 1 Drawing Sheet

SYSTEM AND METHOD FOR HEATING BACK-UP BATTERY OF MOTOR VEHICLE EMERGENCY RADIO COMMUNICATION DEVICE WHEN TEMPERATURE IS BELOW A LIMIT VALUE

TECHNICAL FIELD

This disclosure relates to an emergency system for a motor vehicle having an on-board power supply system capable of triggering a radio emergency call in the case of an emergency regardless of the state of the on-board power supply system of the motor vehicle and, further, relates to a method, of operating such an emergency system.

BACKGROUND

In September 2011, the European Commission decided that new cars need to be equipped with an automatic emergency system which self-actingly informs a rescue coordination center in the case of a traffic accident as from the year 2015. In the case Of an accident, the severity of the accident is to be detected via crash sensors. The result is supposed to be transmitted to an emergency call center via a mobile radio communication network together with other data, for example, the location of the accident (which can be determined e.g. via Global Positioning System (GPS)), which center thereupon immediately informs the responsible rescue coordination center. Hopes are that the number of traffic deaths may be significantly reduced through rescue measures which can be initiated more rapidly as a consequence thereof.

As generally known, the term "on-board power supply system" of a motor vehicle refers to the entirety of all the electric components therein. Generally, it comprises an energy storage device from which it is supplied, where required an electric generator, sensors, modules for position determination (e.g. a OPS module), indicator elements such as warning lights and control lights, actuators (in particular electric motors), audio systems (speakers, audio amplifiers) as well as one or more control devices that actuate the components, in particular an on-board electronic system, and cable systems and bus systems connecting the aforementioned.

In the case of accidents, the on-board power supply systems of the motor vehicles involved in the accident are often affected or even intentionally deactivated. Therefore, an emergency system generally comprises a distinct energy storage device, a back-up battery or emergency battery, and is therefore independent from the energy storage device that supplies the on-board power supply system.

As generally known, the capacity of batteries depends on the operating temperature to a significant degree. At low temperatures, for example, at temperatures of less than 0° C. which can typically occur during a European winter, commercially available battery systems provide significantly lower voltages than at temperatures above 0° C. Their capacity decreases to a fraction of the nominal capacity. To ensure the functioning of an emergency system even in such extreme situations, it is common to dimension battery systems significantly greater than would be necessary for an operation exclusively at "normal temperature" (e.g. at an outdoor temperature between 0° C. and 40° C.)

There is, therefore, a need to provide an emergency system which performs its functions reliably even at extremely low temperatures.

SUMMARY

We provide an emergency system for a motor vehicle having an on-board power supply system which triggers in an emergency a radio emergency call regardless of the state of the on-board power supply system of the motor vehicle, including a radio communication device that triggers the emergency call, a back-up battery including one or more electrochemical cells that supply the radio communication device with electric energy, and an electric heating device supplied with power by the on-board power supply system with which the back-up battery can be heated when its temperature is below or drops below a lower limit value, wherein the electric heating device is a heating foil including heating resistors laminated between electrically insulating foils and having a thickness <2 mm, and the heating foil is arranged in a substantially planar, two-dimensional contact to the electrochemical cell(s) of the battery.

We also provide an emergency system for a motor vehicle having an on-board power supply system which triggers in an emergency a radio emergency call regardless of the state of the on-board power supply system of the motor vehicle, including a radio communication device that triggers the emergency call, a back-up battery including one or more electrochemical cells that supply the radio communication device with electric energy, and an electric heating device supplied with power by the on-hoard power supply system with which the back-up battery can be heated when its temperature is below or drops below a lower limit value.

We further provide a method of operating an emergency system for a motor vehicle having an on-board power supply system which triggers in an accident a radio emergency call regardless of the state of the on-board power supply system of the motor vehicle, wherein the emergency system includes a radio communication device that triggers the emergency call and a back-up battery including one or more electrochemical cells that supply the radio communication device with electric energy, wherein the back-up battery is heated by an electric heating device supplied with power by the on-board power supply system when its temperature is below or drops below a lower limit value.

BRIEF DESCRIPTION OF THE DRAWINGS

FIG. 1b shows a cross section of the battery of FIG. 1a.

DETAILED DESCRIPTION

Figure 1A:
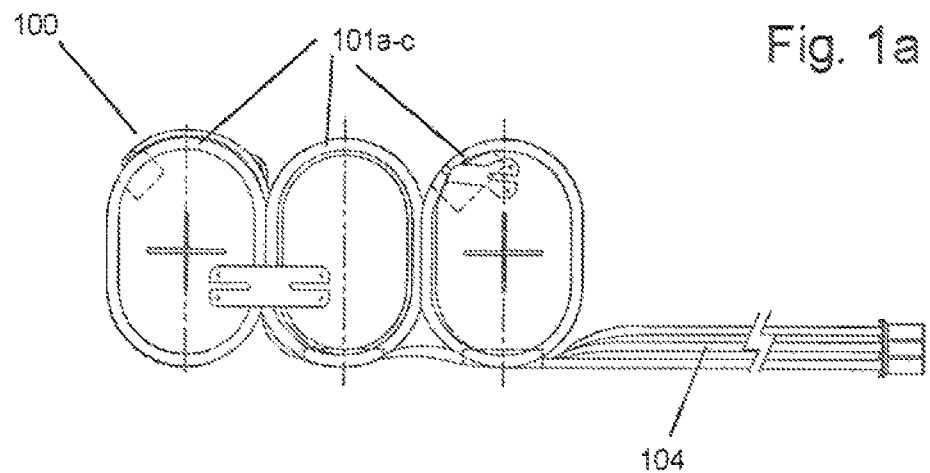
FIG. 1a shows a front elevational view of an example of a multi-cell battery adapted for use in our emergency system.

It will be appreciated that the following description is intended to refer to specific examples of structure selected for illustration in the drawings and is not intended to define or limit the disclosure, other than in the appended claims.

Our emergency system, as the aforementioned known emergency systems, is provided for use in motor vehicles having an on-board power supply system, in particular integrated in a motor vehicle. Thus, in the case of an emergency, in particular in the case of an accident, it triggers a radio emergency call completely independently of the state of the on-hoard power supply system. Even in the case of a complete breakdown of the on-board power supply system, for example, in the case of an intentional or unintentional disconnection of the energy storage device assigned to the on-board power supply system from the remaining components of the on-board power supply system, the emergency system should be able to perform its functions.

The emergency system comprises a radio communication device that triggers the emergency call. Generally, this is a radio communication device using mobile phone networks with cellular (like Global System for Mobile Communications (GSM), Universal Mobile Telecommunications System (UMTS), General Packet Radio Service (GPRS), Digital Enhanced Cordless Telecommunications (DECT) or Long Term Evolution (LTE)) or satellite technology. The radio communication device is preferably coupled to one or multiple crash sensors, where necessary via an on-board electronic system associated with the on-board power supply system. Via the on-board electronic system, the radio communication device can also be coupled to other components of the on-board power supply system, in particular to a module that determines position. In the case of an emergency, a predefined data set is transmitted to an emergency call center via the radio communication device, which center can take the aforementioned measures based on the information received.

Preferably, the radio communication device comprises a return-channel. Via the channel, casualties of the accident may communicate with the aforementioned emergency call center in the case of an accident, for example. In these cases, the radio communication device is preferably coupled to a speaker and/or an audio amplifier and/or a microphone, which are preferably part of the on-board power supply system.

Besides the radio communication device, the emergency system furthermore comprises a back-up battery that supplies the radio communication device with electric energy. In case the radio communication device disposes of the aforementioned return channel, also the speaker and/or the audio amplifier and/or the microphone are supplied by the back-up battery in case of an emergency where required so that a bidirectional communication is possible.

The term "battery" originally referred to multiple electrochemical cells connected in series. However, nowadays also single electrochemical cells are often referred to as "batteries". This shall likewise apply herein. The back-up battery can correspondingly comprise one or multiple electrochemical cells. In turn, each of the single cells comprises at least one positive electrode and at least one negative electrode as well as one or multiple separators separating the electrodes from one another.

Our emergency system particularly comprises an electric heating device by which the back-up battery can be heated when its temperature is below a lower limit value or drops below such a lower limit value. The heating device is supplied with power by the on-board power supply system. Preferably, it comprises one or multiple heating resistors converting electric energy into thermal energy. An emergency operation can still be ensured even at temperatures below minus 40° C. with such a solution.

Preferably, the heating device is coupled to the positive pole switched by the ignition starter switch (terminal 15 according to DIN 72552) of the on-hoard power supply system of a motor vehicle. The heating device can then only be activated if the ignition is switched-on.

Preferably, the emergency system comprises a temperature sensor with which the temperature of the back-up battery is detected, as well as an electronic control device which controls the heating device in response to the temperature measured by the temperature sensor. As an alternative, actuation can also be achieved via the above-mentioned on-board electronic system associated to the on-hoard power supply system, provided the latter is coupled to the temperature sensor.

Generally, the on-board power supply system comprises at least one distinct temperature sensor with which the ambient temperature of the motor vehicle and/or its internal temperature are detected. Preferably, the heating device is controlled in response to a temperature measured by the temperature sensor. Actuation is effected where required, preferably, also via the above-mentioned on-board electronic system associated with the on-board power supply system.

In both cases, at first the aforementioned lower limit value is predefined, for example, to minus 20° C. If during activation of the on-board power supply system, in particular via the aforementioned ignition starter switch or at a later time, temperature is measured by one of the temperature sensors which is below the lower limit value, the heating device of the emergency system is activated by one of the aforementioned control devices. The heating device heats the back-up battery to re-establish operability in a very short time.

As soon as the temperature of the back-up battery reaches a predefined upper limit Value, further heating is no longer required. The heating device is deactivated or reduced by the associated control electronics.

Preferably, the emergency system comprises a fuse when prevents the back-up battery from being damaged by uncontrolled heating, for example, as a consequence of a sensor defect. In particular, the fuse is a thermal fuse triggered when the back-up battery reaches a critical temperature and deactivates the heating device.

Particularly preferably, the back-up battery is a rechargeable battery, in particular a nickel metal hydride battery or a lithium ion battery.

Preferably, the emergency system comprises a charging electronic system with which the back-up battery can be recharged as soon as its charge state drops below a lower limit value. The voltage required therefore is preferably provided by the on-board power supply system.

Particularly preferably, the heating device is integrated in the back-up battery. As described above, the back-up battery employed can comprise one or more electrochemical cells, connected in series or in parallel, as the case may be. Generally, the cells are positioned in a casing from which conductors that are connected to the positive and the negative electrodes of the cells, are led off to the outside. The casing can, for example, be a foil casing, in particular made of a multi-layer composite foil. Integration of the heating device into the back-up battery is supposed to mean that the battery is arranged inside such a casing. This entails that besides the aforementioned lead off conductors, additional conductors that supply the heating device with power are to be led through the casing. Since this may involve a considerable effort, it is also possible to arrange the heating device on the exterior of the casing.

So that heat can be transferred most efficiently from the heating device to the back-up battery, regardless whether the heating device is arranged within the casing or on the exterior thereof, it is preferred that the battery is in a planar, 2-dimensional contact to the heating device. This can particularly well be realized if the heating device is a heating foil.

Heating foils are planar, very flat heating devices (preferably having thicknesses <5 mm, preferably <2 mm, in particular <1 mm), into which heating resistors, preferably in the type of a foil or in the type of a web (the latter, for example, produced by etching metal foils, metallization, in particular electrochemical metallization, or rolling or printing) are arranged, in particular laminated, between electrically insulating foils, mats or sheets, in particular made from plastics or from a fiber composite impregnated by resin. Due to their thin profile, such heating foils can be used for various purposes. Their flexibility allows to obtain a close thermal connection to the battery to be heated.

As a material for the heating resistors of heating devices, generally all known heating conductor materials, however, not only such materials having an almost constant specific electric resistance over wide temperature ranges (such as constantan), in fact, even heating resistors having a temperature dependent heating capacity can be used.

Thus, preferably, heating devices can be used wherein the heating capacity at a constant voltage drops by at least 1 decimal power, preferably by at least two decimal powers, when the temperature increases from minus 40° C. to plus 20° C.

Likewise, the effective electric resistance R [Ω] of the heating device increases preferably by at least 1 decimal power, preferably by at least two decimal powers, when the temperature increases from minus 40° C. to plus 20° C.

Preferably, the heating device comprises at least one heating resistor, the specific electric resistance ρ [Ωm] of which increases by at least 1 decimal power, preferably by at least two decimal powers, in particular by at least 3 decimal powers, when the temperature increases from minus 40° C. to plus 20° C. Preferably, in this case the specific electric resistance increases to a value $>10^6$ Ωm.

Heating resistors having corresponding properties are known.

Preferably, at temperatures above 0° C., resistance of the heating element is so high that current practically no longer flows through the heating element. Correspondingly, its heating capacity is at 0. If the temperature decreases, higher currents can flow through the heating element, which is heated thereby. Such a heating device does not require an external regulation, for example, by the aforementioned electronic control devices or the aforementioned fuse. It discretely switches itself on or of in response to the temperature of the battery.

Particularly preferably, the back-up battery of an emergency system is dimensioned such that in the charged state at a temperature of minus 40° C. or lower, preferably of minus 20° C. or lower, in particular at a temperature below 0° C., without the heating device, it is not capable of providing a voltage sufficient to operate the mobile radio communication device. As mentioned above, it is common in the case of known emergency systems to significantly over-dimension the back-up batteries used to ensure their operability even at very low temperatures. This is no longer required for our emergency system since, with the heating device, the back-up battery is always kept in a temperature window in which it provides an optimum performance.

Our method operates an emergency system for a motor vehicle having an on-board power supply system. The method—as our emergency system—ensures that in the case of an emergency, a radio emergency call is triggered regardless of the state of the on-board power supply system of the motor vehicle. The emergency system corresponds to the one described above, it comprises a radio communication device that triggers the emergency call, and a back-up battery to supply the radio communication device with electric energy. The method is characterized in that the back-up battery is heated by an electric heating device supplied with power by the on-board power supply system when its temperature is below or drops below a limit value.

Further features arise from the subsequent description of the drawings. At this point, it is explicitly noted that all facultative aspects of the emergency system or of the method described herein can be realized in each case on their own or in a combination with one or more of other described facultative aspects in an example. The following description of preferred examples merely serves for explanation and for a better understanding and shall not be understood as limiting in any way.

In FIG. 1a, a multi-cell battery 100 is suitable as a back-up battery for our emergency system. It comprises three single cells 101a-c electrically connected in series as well as connecting means 104. Via the latter, the battery 100 can be coupled to the radio communication device of the emergency system.

Figure 1B:
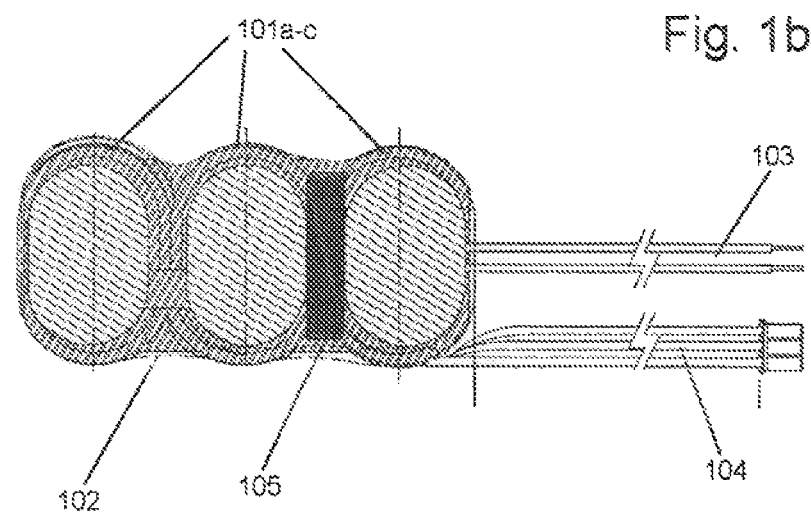

In FIG. 1b, the battery of FIG. 1a is shown, wherein the visible side of the single cells 101a-c is covered with a heating foil 102. The heating foil 102 can be coupled to a power source, preferably the on-board power supply system of a motor vehicle, via connecting means 103. The single cells 101a-c can be encased together with the heating foil by a casing, for example, by a foil casing. In this case, the connecting means 103 and 104 are to be led outwards through the casing.

In the example illustrated, the battery 100 also comprises facultative short circuit protection and/or overcharge protection 105 which can for example be a positive temperature coefficient (PTC) element.

Although the apparatus and methods have been described in connection with specific forms thereof, it will be appreciated that a wide variety of equivalents may be substituted for the specified elements described herein without departing from the spirit and scope of this disclosure as described in the appended claims.

The invention claimed is:

1. An emergency system for a motor vehicle having an on-board power supply system which triggers in an emergency a radio emergency call regardless of a state of the on-board power supply system of the motor vehicle, comprising:
   a radio communication device that triggers the emergency call,
   a back-up battery comprising one or more electrochemical cells that supply the radio communication device with electric energy, the back-up battery being dimensioned such that, in a charged state at a temperature of minus 40° C., the back-up battery is not capable of providing a voltage sufficient to operate the radio communication device, and
   an electric heating device supplied with power by the on-board power supply system with which the back-up battery is configured to be heated when its temperature is below or drops below a lower limit value, wherein the heating device 1) is a heating foil comprising heating resistors laminated between electrically insulating foils and having a thickness <2mm, and the heating foil is arranged in a substantially planar, two-dimensional contact to the one or more electrochemical cells of the back-up battery, and 2) comprises a heating resistor whose specific electric resistance ρ [Ωm] increases by at least 1 decimal power when temperature increases from minus 40° C. to plus 20° C. and is arranged to regulate the heating device.

2. The system according to claim 1, further comprising a temperature sensor and an electronic control device which controls the heating device in response to measured temperature.

3. The system according to claim 1, wherein the on-board power supply system comprises control electronics and an on-board distinct temperature sensor, and the control electronics controls control the heating device in response to a measured temperature.

4. The system according to claim 1, wherein the back-up battery is a nickel metal hydride or lithium ion rechargeable battery.

5. The system according to claim 1, wherein the heating device is integrated in the back-up battery or is in direct contact with a casing of the back-up battery.

6. The system according to claim 1, wherein heating capacity of the heating device at a constant voltage decreases by at least 1 decimal power when temperature increases from minus 40° C to plus 20° C.

7. The system according to claim 1, wherein effective electric resistance R [Ω] of the heating device increases by at least 1 decimal power when the temperature increases from minus 40° C to plus 20° C.

8. A method of operating an emergency system for a motor vehicle having an on-board power supply system which triggers in an accident a radio emergency call regardless of the state of the on-board power supply system of the motor vehicle, wherein the emergency system comprises a radio communication device that triggers the emergency call and a back-up battery comprising one or more electrochemical cells that supply the radio communication device with electric energy, the back-up battery being dimensioned such that, in a charged state at a temperature of minus 40° C., the back-up battery is not capable of providing a voltage sufficient to operate the radio communication device, the method comprising:

heating the back-up battery when its temperature is below or drops below a lower limit value, by an electric heating device supplied with power by the on-board power supply system and comprising a heating foil comprising heating resistors laminated between electrically insulating foils and having a thickness <2 mm, the heating foil arranged in a substantially planar and two-dimensional contact to the one or more electrochemical cells, and regulating the heating device, by a heating resistor whose specific electric resistance ρ [Ωm] increases by at least 1 decimal power when temperature increases from minus 40 ° C. to plus 20 ° C.

* * * * *